United States Patent
Kikuchi et al.

(10) Patent No.: US 7,236,283 B2
(45) Date of Patent: Jun. 26, 2007

(54) SCANNING MIRROR UNIT AND BEAM SCANNING PROBE

(75) Inventors: Naoki Kikuchi, Tokyo (JP); Masayoshi Esashi, Miyagi-ken (JP); Yoichi Haga, Miyagi-ken (JP); Masanori Maeda, Saitama-ken (JP)

(73) Assignees: PENTAX Corporation, Tokyo (JP); Esashi, Masayoshi, Miyagi-Ken (JP); Haga, Yoichi, Miyagi-Ken (JP)

( * ) Notice: Subject to any disclaimer, the term of this patent is extended or adjusted under 35 U.S.C. 154(b) by 85 days.

(21) Appl. No.: 10/863,382

(22) Filed: Jun. 9, 2004

(65) Prior Publication Data

US 2004/0262507 A1 Dec. 30, 2004

(30) Foreign Application Priority Data

Jun. 9, 2003 (JP) .............................. 2003-163449

(51) Int. Cl.
G02B 26/08 (2006.01)
(52) U.S. Cl. ..................................................... 359/224
(58) Field of Classification Search ............... 359/198, 359/212, 213, 214, 224, 225
See application file for complete search history.

(56) References Cited

U.S. PATENT DOCUMENTS

| | | | | |
|---|---|---|---|---|
| 4,691,212 A | * | 9/1987 | Solcz et al. | 347/257 |
| 5,579,149 A | * | 11/1996 | Moret et al. | 359/223 |
| 5,701,901 A | * | 12/1997 | Lum et al. | 600/463 |
| 5,742,419 A | | 4/1998 | Dickensheets et al. | |
| 5,907,425 A | | 5/1999 | Dickensheets et al. | |
| 6,069,727 A | * | 5/2000 | Cho et al. | 359/226 |
| 6,108,118 A | * | 8/2000 | Minamoto | 359/224 |
| 6,483,626 B2 | | 11/2002 | Suga | |
| 6,643,045 B2 | * | 11/2003 | Fujita et al. | 359/224 |
| 2002/0174716 A1 | * | 11/2002 | Ray | 73/105 |

(Continued)

FOREIGN PATENT DOCUMENTS

EP 1142529 10/2001

(Continued)

OTHER PUBLICATIONS

L. Zhang et al., "Microscanner Actuated by Double PZT Thin Film" Proceedings of SPIE, 2001, vol. 4408, pp. 528-534.

(Continued)

*Primary Examiner*—Euncha P. Cherry
(74) *Attorney, Agent, or Firm*—Greenblum & Bernstein, P.L.C.

(57) ABSTRACT

A scanning mirror unit for scanning a beam comprises: at least one cantilever which is formed by bonding an elastic material and a piezoelectric material together and supported by a base at its one end; and a movable mirror which is supported at least by a free end of the cantilever at its peripheral part. When voltage is applied to the piezoelectric material, the free end of the cantilever moves in a prescribed direction to press and move the peripheral part of the movable mirror while leaving a central part of the movable mirror at substantially the same position to cause a tilt to the movable mirror. With such composition of the scanning mirror unit, a reflecting member having a sufficient thickness (e.g. some hundreds of microns) can be employed for the movable mirror, by which a high power laser beam effective for treatment of affected parts, etc. can be reflected finely and durably.

20 Claims, 8 Drawing Sheets

U.S. PATENT DOCUMENTS

2004/0122289 A1    6/2004    Mizuno

FOREIGN PATENT DOCUMENTS

| JP | 52-037056   | 3/1977  |
| JP | 11-221192   | 8/1999  |
| JP | 2001-87269  | 4/2001  |
| JP | 2001-264677 | 9/2001  |
| JP | 2002-189176 | 7/2002  |
| JP | 2002-287075 | 10/2002 |
| WO | 02/037162   | 5/2002  |

OTHER PUBLICATIONS

J. Tsaur et al., "2D Micro Scanner Actuated by Sol-gel Derived Double Layered PZT" IEEE 2002.

T. Xie et al., Endoscope Optical Coherence Tomography with a Micromachined Mirror.

Smits et al., "Dynamic and Static Behavior of Piezoelectric Bimorphs in Optical Scanners," 2000 IEEE Ultrasonics Symposium, Oct. 22, 2000.

\* cited by examiner

SCANNING MIRROR UNIT AND BEAM SCANNING PROBE

BACKGROUND OF THE INVENTION

The present invention relates to a scanning mirror unit for scanning a beam which is used for obtaining observation images of the inside of a body cavity and for treating tissues etc. inside the body cavity, and a beam scanning probe which is equipped with the scanning mirror unit.

In surgical operations such as cranial nerve surgery using an endoscope (removal of a brain tumor, etc.) and intrauterine fetal surgery using a hysteroscope, high-precision intra-cavity operations (intra-body-cavity operations) using lasers are effective measures. For such operations, high-precision observation with high resolution is also required.

Intra-cavity operations, guiding a laser beam to the inside of a body cavity by an optical fiber, etc. and applying the laser beam to a tissue for incision, evaporation and conglutination, have been put into practice today. However, the irradiation range of the laser beam is generally wider than the core diameter of the optical fiber and it is difficult to treat tissues precisely. The irradiation range can be narrowed by converging the laser beam by use of a lens; however, it becomes necessary to move the tip of the optical fiber or probe in order to provide effective treatment. For mechanically moving the tip of the probe precisely, a complicated mechanism becomes necessary and it is difficult to ensure high reliability.

A beam converged by a lens can be scanned on a target (object) precisely by placing a microscanner between the lens and the focal point. For example, a type of confocal probe, observing a tissue by applying a laser beam to a tissue inside a body cavity and extracting particular reflected light (at a focal point of the objective optical system on the object side) from reflected light from the irradiated tissue, has been proposed and brought into practical use (see JP-A-11-221192 (pages 3–5, FIGS. 3–5), for example). Meanwhile, OCT (Optical Coherence Tomography) probes having the function of optical coherence tomography (obtaining a tomogram of the inside of a body cavity by use of light of low coherence) are also well known and in practical use today. An example of such a probe is disclosed in Japanese Patent Provisional Publication No. P2001-87269A.

The probes disclosed in the above patent documents are scanning probes which obtain 2-D images or 3-D images of a tissue (observation target) by scanning a laser beam emitted by a light source device on the tissue as the observation target by driving a microscanner.

However, the mirror used for such a scanner is generally thin and easily damaged in cases where a high power laser beam having high intensity effective for treatment of affected parts is scanned. The mirror of a microscanner (scanning mirror unit) formed by surface micromachining, etc. can not be thickened because of its manufacturing process.

SUMMARY OF THE INVENTION

It is therefore the primary object of the present invention to provide a scanning mirror unit having a mirror that can reflect a high power laser beam effective for treatment of affected parts, etc. finely and durably, and a beam scanning probe having such a scanning mirror unit.

In accordance with an aspect of the present invention, there is provided a scanning mirror unit for scanning a beam, the scanning mirror unit including: at least one cantilever made of material deforming itself when activated, the cantilever being supported by a base at its one end to have a free end; and a movable mirror which is supported at least by the free end of the at least one cantilever at its peripheral part so that it can be moved while leaving its central part substantially fixed at the same position. When the cantilever is activated, the free end of the cantilever moves in a prescribed direction to move the peripheral part of the movable mirror with the central part substantially fixed at the same position to cause a tilt to the movable mirror. With such composition of the scanning mirror unit, a reflecting member having a sufficient thickness (e.g. some hundreds of microns) can be employed for the movable mirror. Such a scanning mirror unit is capable of reflecting a high power laser beam effectively for treatment of affected parts, etc. finely and durably.

In the scanning mirror unit, the cantilever may optionally be formed by bonding an elastic material and a piezoelectric material together. In this case, the free end moves in the prescribed direction when voltage is applied to the piezoelectric material. The cantilever may also be formed by bonding two piezoelectric materials together, or by bonding an elastic material and two piezoelectric materials sandwiching the elastic material together. In these cases, the free end of the cantilever moves in the prescribed direction when voltage is applied to the two piezoelectric materials. Further, the cantilever may also be formed by bonding two materials having different thermal expansion coefficients together and providing at least one of the materials with an electric heater. In this case, the free end of the cantilever moves in the prescribed direction when electric current is supplied to the electric heater.

Optionally, the beam may be an optical beam as a bundle of rays or an ultrasonic beam as a bundle of ultrasonic waves.

The scanning mirror unit may further comprise an axis head which supports the central part of a support surface of the movable mirror which is opposite to a reflecting surface of the movable mirror. The cantilever supports the peripheral part of the reflecting surface of the movable mirror.

In the scanning mirror unit, a deformation part which can be deformed at least biaxially may be formed between the cantilever and the movable mirror. In this case, the deformation part may be formed integrally with the cantilever. The free end of the cantilever may be provided with a convexity which supports the peripheral part of the movable mirror, or the peripheral part of the movable mirror may be provided with a convexity which is supported by the free end of the cantilever.

In the scanning mirror unit, the central part of the support surface of the movable mirror may be provided with a concavity which is supported by the axis head.

In the scanning mirror unit, the at least one cantilever may include a plurality of cantilevers. In this case, the cantilevers may be arranged so that their lengthwise directions will coincide with one another.

Optionally, the scanning mirror unit may further comprise a sensor for measuring the movement of the cantilever. In this case, the movement of the cantilever can be controlled based on the measurement by the sensor.

In accordance with another aspect of the present invention there is provided a beam scanning probe for obtaining observation images by scanning a beam emitted by a wave source unit on an observation target in a body cavity by a scanning mirror unit. In the beam scanning probe, the scanning mirror unit comprises: at least one cantilever made of material deforming itself when activated, the cantilever being supported by a base at its one end to have a free end; and a movable mirror which is supported at least by the free end of the at least one cantilever at its peripheral part so that it can be moved while leaving its central part substantially fixed at the same position. When the cantilever is activated, the free end of the cantilever moves in a prescribed direction to move the peripheral part of the movable mirror with the central part substantially fixed at the same position to cause a tilt to the movable mirror. The beam may be an optical beam as a bundle of rays or an ultrasonic beam as a bundle of ultrasonic waves.

In the beam scanning probe, the scanning mirror unit may be installed in the tip of the beam scanning probe, and the at least one cantilever may be placed so that its lengthwise direction will coincide with that of the beam scanning probe. The at least one cantilever may include a plurality of cantilevers. By such composition, the space necessary for the scanning mirror unit in the radial direction of the optical beam scanning probe can be cut down and thereby the diameter of the optical beam scanning probe can be reduced easily.

The beam scanning probe may further comprise a transmitting member which is provided to the lateral face of the beam scanning probe for transmitting the beam. In this case, the movable mirror is placed being tilted relative to the lengthwise direction so that it can guide the beam to the transmitting member.

The beam scanning probe may further comprise: a transmitting member which is provided to the front end face of the beam scanning probe for transmitting the beam; and a fixed mirror which is fixed so as to guide the beam reflected by the movable mirror to the transmitting member. In this case, the movable mirror is placed so that it can guide the beam to the fixed mirror.

DESCRIPTION OF THE PREFERRED EMBODIMENTS

Figure 1:
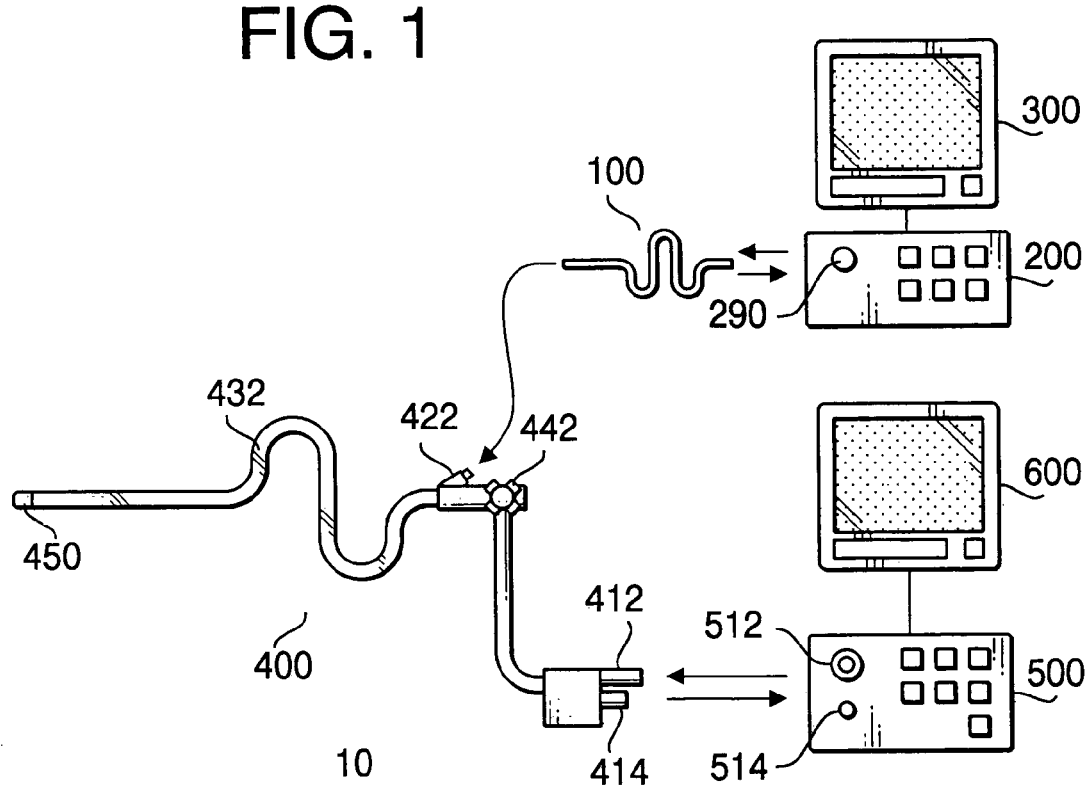
FIG. 1 is a schematic block diagram showing the composition of an endoscope device including a beam scanning probe in accordance with an embodiment of the present invention.

Referring now to the drawings, a description will be given in detail of preferred embodiments in accordance with the present invention.

FIG. 1 is a schematic block diagram showing the composition of an endoscope device 10 including a beam scanning probe in accordance with an embodiment of the present invention. The endoscope device 10 includes an electronic endoscope device and an optical beam scanning probe device. In the following, the composition and function of the endoscope device 10 will be described referring to FIG. 1.

The electronic endoscope device of the endoscope device 10 includes an electronic endoscope 400 which is inserted into a body cavity for picking up images of an observation target, a processor 500 having an image processing function (for properly processing an image signal outputted by the electronic endoscope 400) and an illumination function (for emitting light for illuminating the observation target), and a monitor 600 for displaying images according to the image signal processed and outputted by the processor 500.

Figure 2:
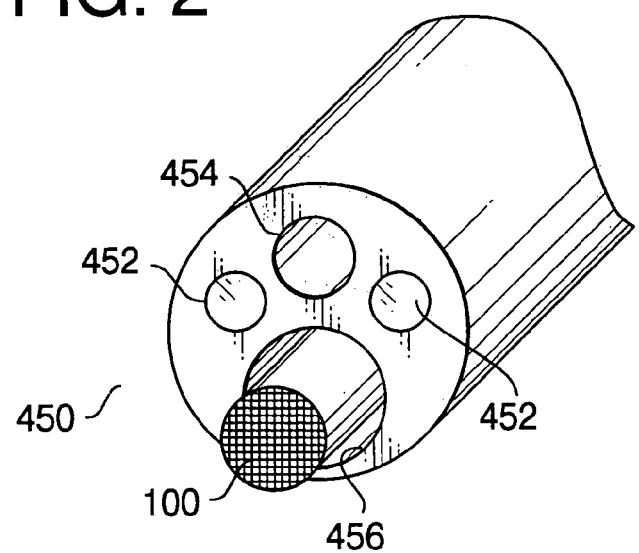
FIG. 2 is an enlarged view showing the tip of an electronic endoscope employed in the embodiment.

FIG. 2 is an enlarged view showing the tip 450 of the electronic endoscope 400 employed in this embodiment. The composition and function of the electronic endoscope device will be explained below referring to FIGS. 1 and 2.

The electronic endoscope 400 has a connector part for connecting the electronic endoscope 400 with the processor 500. The connector part includes a fiber plug 412 which is used for inputting the illuminating light to a light guide of the electronic endoscope 400 and a cable plug 414 for electrically connecting the electronic endoscope 400 with the processor 500. The fiber plug 412 and the cable plug 414 of the connector part of the electronic endoscope 400 are connected to a fiber jack 512 and a cable jack 514 of the processor 500, respectively.

Inside the electronic endoscope 400, the light guide, for guiding the illuminating light emitted by the processor 500 to the observation target, is formed along the length of the electronic endoscope 400. As shown in FIG. 2, the front surface of the tip 450 has two illuminating windows 452. The illuminating light emitted by the processor 500 and inputted to the fiber plug 412 (connected to the fiber jack 512 of the processor 500) is guided by the light guide, emerges from the illuminating windows 452, and illuminates the observation target.

Inside and along the length of the electronic endoscope 400 is also a cable for communicating signals between a solid-state image pickup device (installed in the tip 450) and the processor 500. The signals transferred by the cable include a driving signal transmitted from the processor 500 to the solid-state image pickup device and the image signal transmitted from the solid-state image pickup device to the processor 500. The solid-state image pickup device installed in the tip 450 may be a CCD (Charge-Coupled Device), for example. As such a CCD for an electronic endoscope, a frame transfer CCD having no data storage unit is generally used in order to achieve a small diameter of the electronic endoscope. As shown in FIG. 2, the front surface of the tip 450 is provided with an observation system 454. The illuminating light reflected by the observation target is incident upon the observation system 454 as observation light, converted by the CCD into the image signal, transferred through the cable, and inputted to the processor 500 through the cable plug 414.

The electronic endoscope 400 also has a forceps entry 422 from which a variety of operative instruments can be inserted into the electronic endoscope 400. Through the forceps entry 422, forceps used for various treatments (blood stanching, taking samples from tissue, etc.), and/or probes used for observing tissue with magnifications different from that of the electronic endoscope 400 or taking tomograms of tissue, etc. are inserted. The operator can insert a variety of operative instruments through the forceps entry 422 depending on the type of operation.

Inside an insert flexible tube 432 which connects the forceps entry 422 and the tip 450, a forceps channel 456 is formed along the length of the insert flexible tube 432. One end of the forceps channel 456 reaches the forceps entry 422 and the other end reaches an opening formed on the front surface of the tip 450. In short, the forceps channel 456 is a cylindrical channel formed between the forceps entry 422 and the tip 450. An operative instrument inserted into the forceps entry 422 is set so that its front end will protrude a little from the front surface of the tip 450 as shown in FIG. 2.

The electronic endoscope 400 also has a handling section 442 nearby the forceps entry 422 for letting the operator handle the electronic endoscope 400. The handling section 442 has a plurality of knobs for bending the tip 450 in various directions. By manipulating the handling section 442, the operator can face the front surface of the tip 450 to any direction and observe the target in the small body cavity from various angles. The operator can also handle the operative instrument (set in the forceps channel 456) by manipulating the handling section 442.

The image signal generated by the electronic endoscope 400 composed as above is outputted to the processor 500 which executes the image processing for the displaying on the monitor 600. Next, the image processing carried out by the processor 500 will be explained below.

The image signal outputted by the CCD shooting the observation target is sent to a first-stage signal processing unit of the processor 500. The first-stage signal processing unit amplifies the image signal and converts the image signal into a digital signal by sampling, holding, etc. The digital signal is then separated by a multiplexer of the first-stage signal processing unit into image signals of Red, Green and Blue by means of switching in sync with the driving signal supplied to the CCD. Each image signal of each color (R, G, B) is outputted to each memory of an unshown RGB memory.

The RGB memory has three frame memories (R memory, G memory, B memory) corresponding to the three colors R, G and B. The three image signals (R, G, B) separated by the first-stage signal processing unit are temporarily stored in corresponding frame memories, respectively.

An unshown timing generator outputs a timing signal to be used for simultaneously reading out the image signals (R, G, B) from the frame memories of the RGB memory. The timing signal is outputted with timing for properly displaying motion video (including 30 frames per second, for example) on the monitor 600. In other words, the timing generator outputs a timing signal for simultaneously reading out each image signal (R, G, B) from each frame memory of the RGB memory at a speed of 30 frames per second. According to the timing signal, the image signals of the three colors are simultaneously read out and inputted to an unshown second-stage signal processing unit.

The second-stage signal processing unit converts the image signals into analog signals and further converts the analog signals into composite video signals, Y/C signals or RGB video signals to be displayed by the monitor 600. When the video signals are inputted to the monitor 600, video images of the observation target shot by the electronic endoscope 400 are displayed on the monitor 600.

Figure 3:
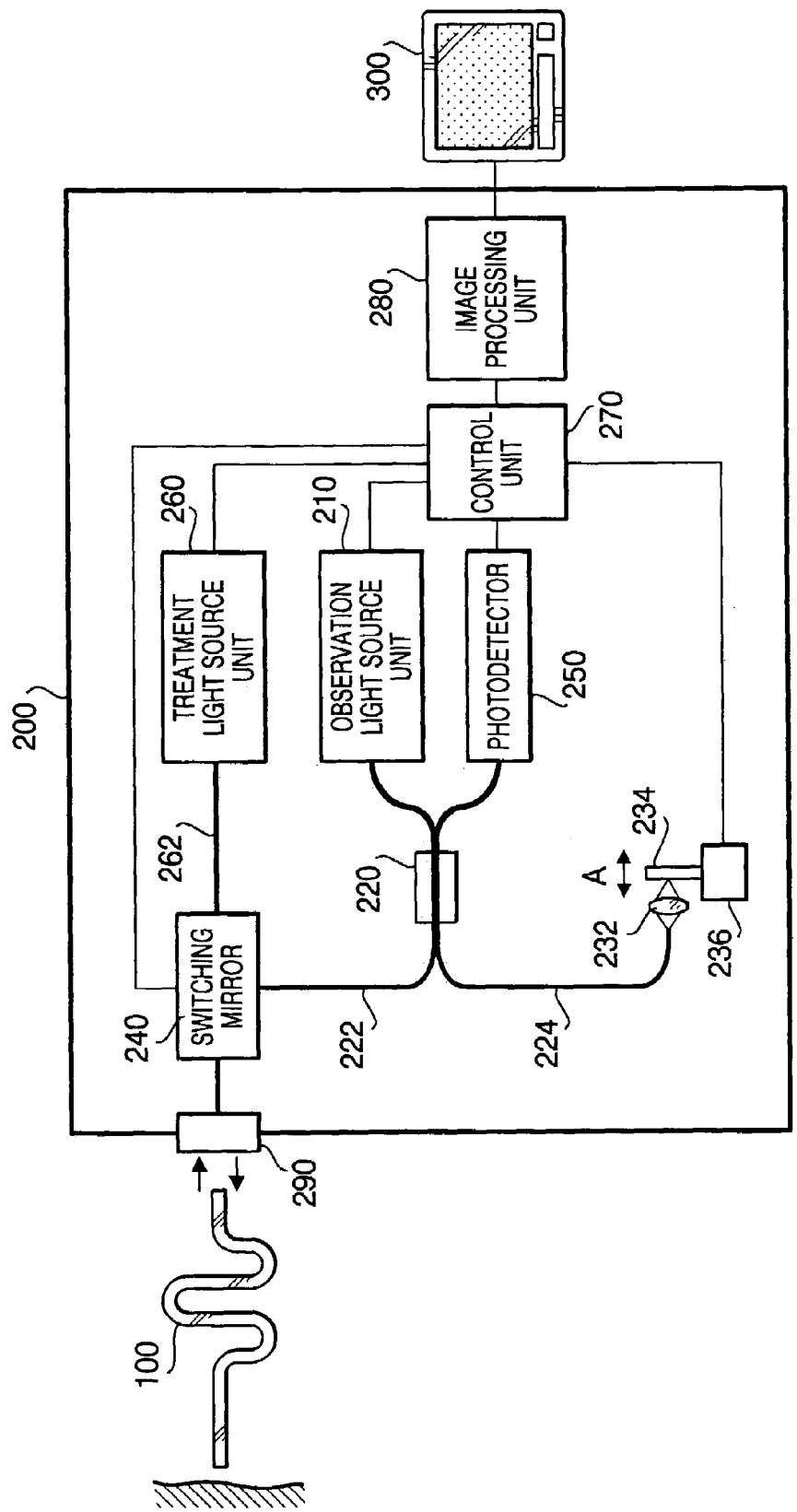
FIG. 3 is a block diagram showing the overall composition of an optical beam scanning probe device of the endoscope device in accordance with the embodiment of the present invention.

FIG. 3 is a block diagram showing the overall composition of the optical beam scanning probe device of the endoscope device 10 in accordance with the embodiment of the present invention. The optical beam scanning probe device of the endoscope device 10 includes an optical beam scanning probe 100 which is inserted into the forceps channel 456 of the electronic endoscope 400 for picking up images of the observation target, a processor 200 having an image processing function (for properly processing the images of the observation target obtained by the optical beam scanning probe 100) and an irradiation function (for emitting light for irradiating the observation target), and a monitor 300 for displaying images according to an image signal processed and outputted by the processor 200. The composition and function of the optical beam scanning probe device will be explained below referring to FIG. 3.

The processor 200 includes an observation light source unit 210. The observation light source unit 210 is implemented by, for example, a light source that emits light of low coherence. The coherence length of a laser beam emitted by the observation light source unit 210 is extremely short (tens to hundreds of microns). The observation light source unit 210 emits the laser beam in response to a driving pulse which is supplied from a control unit 270 of the processor 200. Incidentally, the observation light source unit 210 may also be used for purposes other than observation. In such cases, the wavelength of the laser beam emitted by the light source unit is changed from that for observation.

The laser beam emitted from the observation light source unit 210 travels through a measurement beam fiber 222, which is a single mode optical fiber. A photo coupler 220 is placed on the optical path inside the measurement beam fiber 222. The photo coupler 220 optically couples the measurement fiber 222 with another single mode optical fiber (reference beam fiber 224). Thus, the laser beam emitted from the observation light source unit 210 is split by the photo coupler 220 into two beams. One of the split beams travels through the measurement beam fiber 222 as a measurement beam, while the other beam travels through the reference beam fiber 224 as a reference beam. Incidentally, the measurement beam fiber 222 and the reference beam fiber 224 are not restricted to single mode optical fibers; multimode fibers can also be used as the fibers 222 and 224.

In addition to the observation light source unit 210, the processor 200 includes a treatment light source unit 260. The treatment light source unit 260 emits a laser beam having a particular wavelength suitable for treatment of an affected part. The treatment light source unit 260 emits the laser beam of the particular wavelength in response to a driving pulse which is supplied from the control unit 270. The laser beam emitted by the treatment light source unit 260 travels through a treatment beam fiber 262 as a treatment beam.

On the optical paths of the measurement beam traveling through the measurement beam fiber 222 and the treatment beam traveling through the treatment beam fiber 262, a switching mirror 240 is placed. The switching mirror 240 has a function of guiding one of the measurement beam and the treatment beam incident thereon to the optical beam scanning probe 100 which is connected to a connector part 290 of the processor 200. The switching mirror 240 is, for example, a rotatable mirror which is placed on the optical paths of the beams and guides one of the beams to the optical beam scanning probe 100 depending on its positional state (angle). The operator can select the beam (measurement beam or treatment beam) to be guided to the optical beam scanning probe 100 by switching the position of the switching mirror 240 by operating an unshown operation unit of the processor 200.

The measurement beam or the treatment beam guided to the optical beam scanning probe 100 travels through an optical fiber inside the probe, emerges from an observation window of the probe 100 (which will be explained later), and reaches the observation target in front of the observation window. When the beam guided by the optical beam scanning probe 100 is the measurement beam, the measurement beam is reflected by the observation target, reenters the optical beam scanning probe 100 via a similar optical path, and travels through the fiber inside the probe toward the processor 200. When the beam guided by the optical beam scanning probe 100 is the treatment beam, the treatment beam is applied to the affected part in order to treat the part.

The measurement beam reflected by the observation target and traveling through the optical beam scanning probe 100 as above reenters the measurement beam fiber 222 via the switching mirror 240 and heads for the photo coupler 220 through the measurement beam fiber 222.

Meanwhile, the other beam split by the photo coupler 220, the reference beam, travels through the reference beam fiber 224 which has a lens 232 at its end.

On the optical path of the reference beam emerging from the lens 232, a reference mirror 234, having a reflecting surface orthogonal to the optical axis of the reference beam, is placed. The reference mirror 234 is held by a mirror driver 236 to be movable in a direction parallel to the optical axis of the reference beam (direction A shown in FIG. 3). The mirror driver 236 is a so-called multilayer piezoelectric actuator having a plurality of planar piezoelectric element that are stacked up. When the reference mirror 234 is moved by the mirror driver 236, the length of the optical path of the reference beam from the photo coupler 220 to the reference mirror 234 changes, that is, the optical path length of the reference beam between the photo coupler 220 and the reference mirror 234 can be adjusted by moving the reference mirror 234 by the mirror driver 236.

The reference beam emerging from the reference beam fiber 224 is converged by the lens 232 on the reflecting surface of the reference mirror 234 and reflected by the reflecting surface. The reflected reference beam reenters the lens 232 and travels through the reference beam fiber 224 toward the photo coupler 220.

The measurement beam traveling through the measurement beam fiber 222 after being reflected by the observation target and the reference beam traveling through the reference beam fiber 224 after being reflected by the reference mirror 234 interfere with each other at the photo coupler 220. However, since the laser beam emitted by the observation light source unit 210 is a low-coherence light having a short coherence length of tens to hundreds of microns, the two beams do not interfere with each other when the difference between the optical path length of the measurement beam from the observation target (by which the measurement beam is reflected) to the photo coupler 220 and the optical path length of the reference beam from the reference mirror 234 to the photo coupler 220 is on the order of mm (longer than the coherence length). The two beams interfere with each other only when the optical path length difference between the measurement beam and the reference beam is within the coherence length of the laser beam emitted by the observation light source unit 210.

When the measurement beam reflected by the observation target interferes with the reference beam in the photo coupler 220, the interfering beam is received by a photodetector 250. The photodetector 250 converts the received interfering beam by photoelectric conversion and outputs an image signal to the control unit 270. The image signal received by the control unit 270 is sent to an image processing unit 280 which properly processes the image signal to be displayed on the monitor 300.

The image obtained by the optical beam scanning probe device and displayed on the monitor 300 is a 2-D (two-dimensional) image or 3-D (three-dimensional) image of the observation target. The 2-D image is an image of the observation target like a plan view which is obtained by the function of a scanning mirror unit 130 which will be described later. The 3-D image is an image of the observation target having information in the depth direction, which can be obtained by adjusting the position of the reference mirror 234. In the following, the composition of the optical beam scanning probe device for obtaining the 2-D image of the observation target will be explained.

Figure 4A:
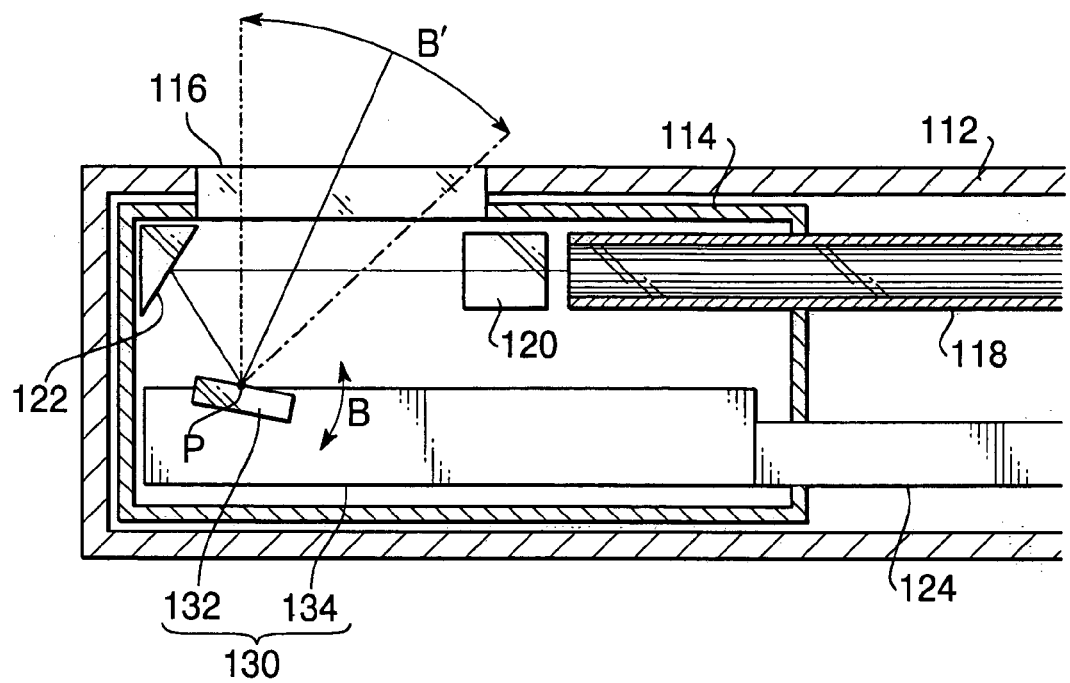
FIGS. 4A and 4B are sectional views schematically showing the internal composition of the tip of an optical beam scanning probe in accordance with the embodiment of the present invention.
Figure 4B:
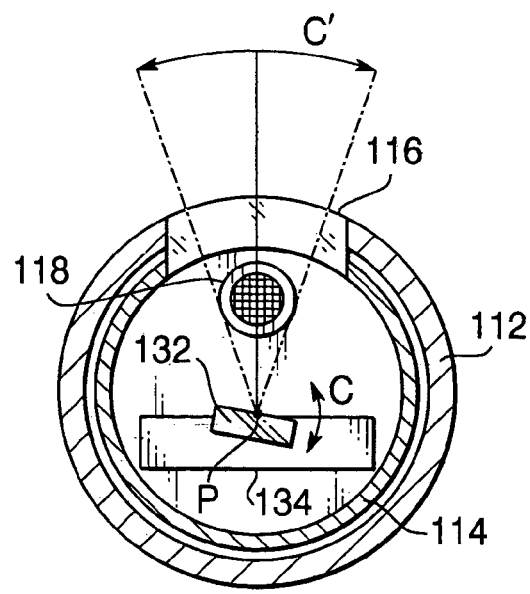

FIGS. 4A and 4B are sectional views schematically showing the internal composition of the tip of the optical beam scanning probe 100 in accordance with the embodiment of the present invention, in which FIG. 4A is a sectional side view showing the internal composition along the lengthwise direction of the optical beam scanning probe 100 and FIG. 4B is a cross-sectional view showing the internal composition in directions orthogonal to the lengthwise direction. The composition and function of the tip of the optical beam scanning probe 100 will be explained below referring to FIGS. 4A and 4B.

The whole length of the optical beam scanning probe 100 is covered by a probe tube 112 which has proper flexibility. A hard package 114 is placed at the tip of the probe tube 112. Part of the tip of the probe tube 112 and part of the package 114 are cut away and an observation window 116 is fit in the cut-away part leaving no gap. Inside and along the length of the probe tube 112, a fiber 118 for transmitting the aforementioned measurement beam is provided. One end of the fiber 118 is connected to the connector part 290 of the processor 200 and the other end is placed inside the package 114.

In the package 114, an objective optical system 120, a fixed mirror 122 and a scanning mirror unit 130 are installed in addition to the end of the fiber 118. The scanning mirror unit 130 is electrically connected to the control unit 270 of the processor 200 by a cable 124. The scanning mirror unit 130 includes a movable mirror 132 which is rotatably supported so as to tilt in various directions in response to driving pulses supplied from the control unit 270. The movable mirror 132 has a reflecting member which is some hundreds of microns thick.

The measurement beam supplied from the processor 200 through the fiber 118 enters the objective optical system 120

(placed in front of the tip of the fiber 118 inside the package 114) and proceeds to the fixed mirror 122 (fixed inside the package 114) via the objective optical system 120. The measurement beam is then reflected by the fixed mirror 122 toward the movable mirror 132 and is reflected by a central point P of the reflecting surface of the movable mirror 132 toward the observation target via the observation window 116. Meanwhile, the movable mirror 132 vibrates in the directions B and C shown in FIGS. 4A and 4B at high speed, by which the measurement beam is scanned on the observation target in the directions B' and C' shown in FIGS. 4A and 4B.

The scanned measurement beam is reflected by the observation target and reenters the observation window 116 via the same optical path. The reflected measurement beam returns to the processor 200 via the movable mirror 132, the fixed mirror 122, the objective optical system 120 and the fiber 118, and interferes with the reference beam in the photo coupler 220. By the above operation, the image of the observation target in the directions B' and C' (2-D image) can be obtained.

Incidentally, the optical beam scanning probe 100 in this embodiment is configured to have lateral view (with a lateral observation window 116). By the lateral view configuration, when the optical beam scanning probe 100 is inserted into a narrow lumen inside the body cavity, the observation system directly faces the side wall of the lumen without the need of bending the tip of the probe. Therefore, the affected part can be observed more easily compared to probes of direct view types. Microscopic treatment is also possible during the observation of the affected part.

In case where observation images in the thrust direction are obtained by use of a radial-type probe, the optical system inside the probe is slid relative to the probe tube. If such a radial-type probe is handled quickly to change the observation area toward the tip of the probe (in the thrust direction), the optical system inside the probe used to occasionally strike other parts and break. On the other hand, the probe of this embodiment can cover a wide range in the thrust direction and observation in the radial direction is also possible by turning the probe itself around its axis by manipulating the handling section 442 of the electronic endoscope 400. Therefore, by the optical beam scanning probe 100 in accordance with the embodiment of the present invention, wide range observation is achieved with ease.

Figure 5A:
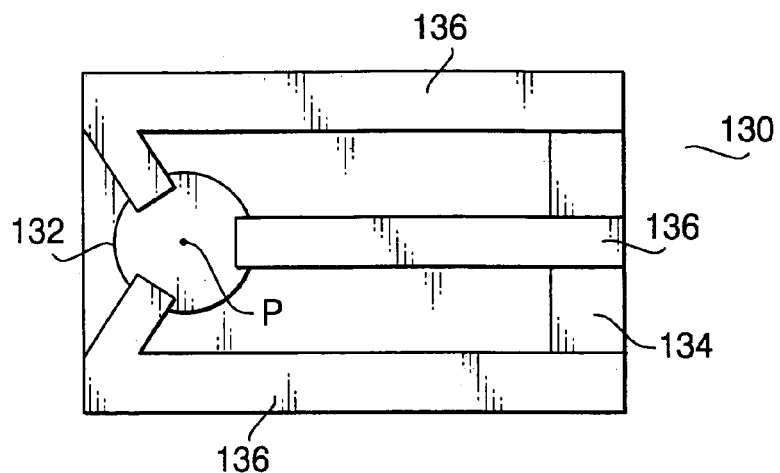
FIGS. 5A through 5C are schematic diagrams showing the composition of a scanning mirror unit which is provided to the tip of the optical beam scanning probe of the embodiment.
Figure 5B:
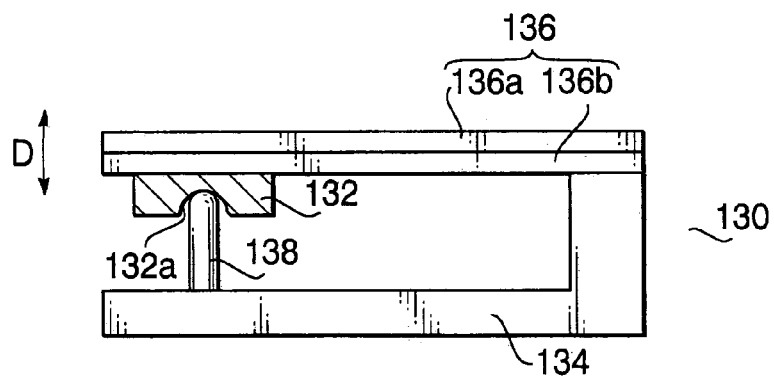
Figure 5C:
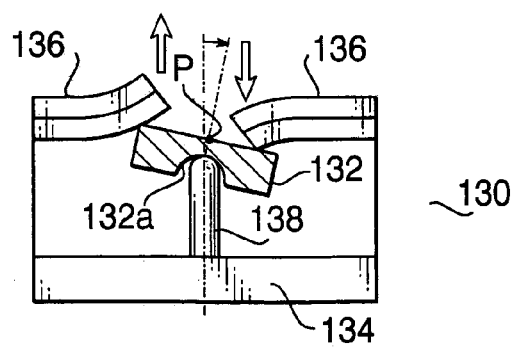

FIGS. 5A through 5C are schematic diagrams showing the composition of the scanning mirror unit 130 which is provided to the tip of the optical beam scanning probe 100 of this embodiment, in which FIG. 5A is a top view of the scanning mirror unit 130 and FIGS. 5B and 5C are side views of the scanning mirror unit 130. The composition and function of the scanning mirror unit 130 will be explained below referring to FIGS. 5A through 5C.

The scanning mirror unit 130 includes a base 134, three cantilevers 136 supported by the base 134, and a support 138, in addition to the movable mirror 132.

The base 134, formed in an L shape as a combination of a long part and a short part, is installed in the package 114. As mentioned above, the base 134 supports the three cantilevers 136 and the support 138.

Each cantilever 136, having the so-called unimorph structure, is formed by bonding an elastic material 136a and a piezoelectric material 136b having rodlike shapes (with rectangular sectional shapes) together. An end of each cantilever 136 is supported by the edge of the short part of the base 134. Thus, the end of the cantilever 136 supported by the base 134 serves as a fixed end and the other end of the cantilever 136 serves as a free end.

The piezoelectric material 136b of each cantilever 136 is electrically connected with the cable 124. Therefore, when voltage is applied to the piezoelectric material 136b via the cable 124, the piezoelectric material 136b expands or contracts depending on the applied voltage and thereby the free end of the cantilever 136 moves in the direction D shown in FIG. 5B. Specifically, when the piezoelectric material 136b expands due to the applied voltage, the piezoelectric material 136b gets longer than the elastic material 136a and thereby the free end of the cantilever 136 moves away from the base 134. On the other hand, when the piezoelectric material 136b contracts due to the applied voltage, the piezoelectric material 136b gets shorter than the elastic material 136a and thereby the free end of the cantilever 136 moves toward the base 134.

In the initial state in which no voltage is applied to each piezoelectric material 136b, the free end of each cantilever 136 is in contact with a peripheral part of the reflecting surface of the movable mirror 132. Each cantilever 136 is formed in a shape extending in one direction so that an enough stroke of the free end in the direction D can be achieved. The three cantilevers 136 are arranged so that their lengthwise directions will coincide with that of the base 134, as shown in FIG. 5A.

The support 138 has an end which is formed in a hemispheric shape. The other end of the support 138 is attached on the long part of the base 134 to be sufficiently apart from the short part (supporting the cantilevers 136) in the lengthwise direction. A hemispheric concavity 132a is formed at the center of a support surface of the movable mirror 132 (opposite to the reflecting surface), and the hemispheric end of the support 138 (axis head) rotatably supports the movable mirror 132 at the concavity 132a.

The support surface of the movable mirror 132 is supported by the axis head of the support 138 at its center, while the reflecting surface of the movable mirror 132 is supported by the three cantilevers 136 at its peripheral parts. Therefore, when voltages are applied to the piezoelectric materials 136b and the free ends of the cantilevers 136 move, the movable mirror 132 (with the center being supported by the axis head of the support 138 and the peripheral parts being pressed by free ends of some cantilevers 136) tilts in various directions. In other words, the movable mirror 132 can tilt in the aforementioned directions B and C around its supporting point (where the concavity 132a contacts the axis head of the support 138). The concavity 132a is formed so that the supporting point (where the concavity 132a contacts the axis head of the support 138) will be as close to the central point P of the reflecting surface as possible, taking the strength of the movable mirror 132 in consideration. Therefore, the movable mirror 132 tilts in the directions B and C, approximately around the central point P of the reflecting surface, that is, approximately around the point upon which the measurement beam is incident.

Figure 6:
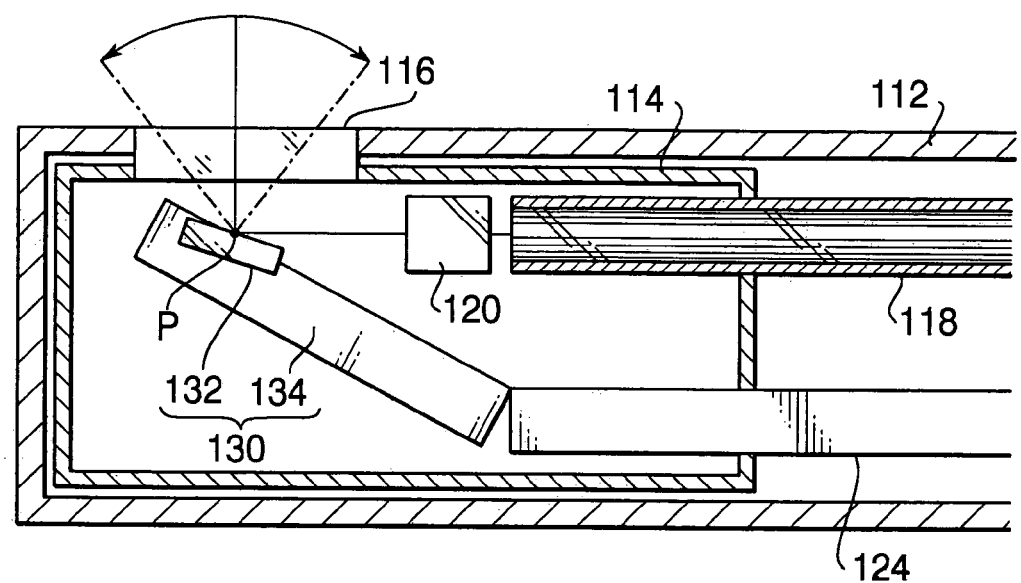
FIG. 6 is a sectional side view schematically showing the internal composition of the tip of an optical beam scanning probe in accordance with another embodiment of the present invention.

FIG. 6 is a sectional side view schematically showing the internal composition of the tip of an optical beam scanning probe in accordance with another embodiment of the present invention, in which elements already shown in FIG. 1 through FIG. 5C in the explanation of the optical beam scanning probe 100 of the previous embodiment are indicated with the same reference characters and repeated description thereof is omitted for brevity.

In this embodiment, the scanning mirror unit 130 is placed to have a particular tilt angle relative to the lengthwise direction of the optical beam scanning probe 100. Specifically, the scanning mirror unit 130 is held in the package 114 so that the central point P of the reflecting surface of the movable mirror 132 will be on the optical axis of the fiber 118 and the objective optical system 120. Therefore, the measurement beam emerging from the objective optical system 120 travels toward the central point P to be reflected by the reflecting surface at the central point P and scanned on the observation target via the observation window 116. Incidentally, it is desirable that the measurement beam travels from the optical beam scanning probe 100 in a direction orthogonal to the lengthwise direction of the probe 100 when the movable mirror 132 is in its initial position (with no tilt relative to the scanning mirror unit 130). Therefore, a desirable angle between the scanning mirror unit 130 and the optical axis of the fiber 118 and the objective optical system 120 is 45 degrees.

Incidentally, while the scanning mirror unit 130 in accordance with the present invention was provided to the optical beam scanning probe 100 having the OCT (Optical Coherence Tomography) function in the above embodiments, the scanning mirror unit 130 may also be provided to scanning probes of other types (e.g. a probe having a confocal microscope).

While each cantilever 136 of the scanning mirror unit 130 in the above embodiments had the unimorph structure which is formed by bonding an elastic material 136a and a piezoelectric material 136b together, cantilevers having bimorph structure (formed by bonding a piezoelectric material 136b to each side of an elastic material 136a) may also be employed for the cantilever 136. With the bimorph structure, the stroke of the free end of each cantilever 136 can be increased and thereby a wider range on the target can be observed at once. As still another embodiment, another bimorph structure formed by bonding two piezoelectric materials 136b together may also be employed for the cantilever 136.

While three cantilevers 136 were employed for the scanning mirror unit 130 in the above embodiments, the number of cantilevers 136 for the scanning mirror unit 130 may also be two, four, or more. The optical beam scanning probe 100 can be more miniaturized by decreasing the number of cantilevers 136.

While the measurement beam was scanned two dimensionally on the observation target by use of a scanning mirror unit 130 in the above embodiments, the 2-D scan of the measurement beam on the observation target may also be implemented by use of two scanning mirror units. The 2-D scan of the measurement beam on the observation target can be realized by letting the two scanning mirror units perform 1-D scans of the measurement beam in different directions. In this case, each scanning mirror unit, required to tilt the movable mirror 132 in only one direction, needs only one cantilever 136, by which the width of each scanning mirror unit (measured in a direction orthogonal to the lengthwise direction) can be reduced considerably. Consequently, the space necessary for the scanning mirror unit in the radial direction of the optical beam scanning probe 100 can be cut down and thereby the diameter of the optical beam scanning probe 100 can be reduced further.

While the movable mirror 132 of the scanning mirror unit 130 was rotatably supported by the support 138 at its concavity 132a in the above embodiments, the scanning mirror unit 130 may also be composed without the support 138. For example, the peripheral parts of the movable mirror 132 may be supported by the free ends of the cantilevers 136 only, by use of an adhesive agent, etc. Specifically, the free end of each cantilever 136 may be bonded to an elastic material which is bonded to a peripheral part of the movable mirror 132. The elastic material has a function of absorbing torsion occurring to the free end of the cantilever 136 and the peripheral part of the movable mirror 132 caused by the movement of the free end. The movable mirror 132 of this example is rotated and tilted around the point P by the movements (deformations) of the cantilevers 136 only. In this case, the movable mirror 132 needs no concavity 132a, therefore, in addition to the reduction of the number of parts and simplification of the assembly process, the process for manufacturing the movable mirror 132 can also be simplified.

While the support 138 was formed to have a hemispheric end in the above embodiments, the support 138 may also be formed to have a pointed end like a needle. In comparison with the support 138 having the hemispheric end, the interface between the movable mirror 132 and the support 138 gets smaller and energy loss due to friction at the interface decreases, by which the revolution and tilting of the movable mirror 132 can be achieved with higher energy efficiency. Preferably, the interface between the movable mirror 132 and the support 138 (e.g. the concavity 132a of the movable mirror 132 and the axis head of the support 138) may be coated with wear-resistant material such as SiC or DLC (Diamond-Like Carbon). By such wear-resistant coating, deterioration of the interface caused by frictional wear can be prevented and thereby secular changes of the scanning mirror unit 130 can be reduced.

While the cantilevers 136 supported the reflecting surface of the movable mirror 132 in the above embodiments, it is also possible to let the cantilevers 136 support the support surface of the movable mirror 132 or the side face of the movable mirror 132 between the reflecting surface and the support surface Depending on how the cantilevers 136 support the movable mirror 132, the size of the scanning mirror unit 130, possible tilt range of the movable mirror 132, resolution of the optical beam scanning probe 100, difficulty of assembly, etc. change. Therefore, the scanning mirror unit 130 can be configured by properly selecting the supporting method depending on the type of the optical beam scanning probe 100 in which the scanning mirror unit 130 is installed.

Figure 7:
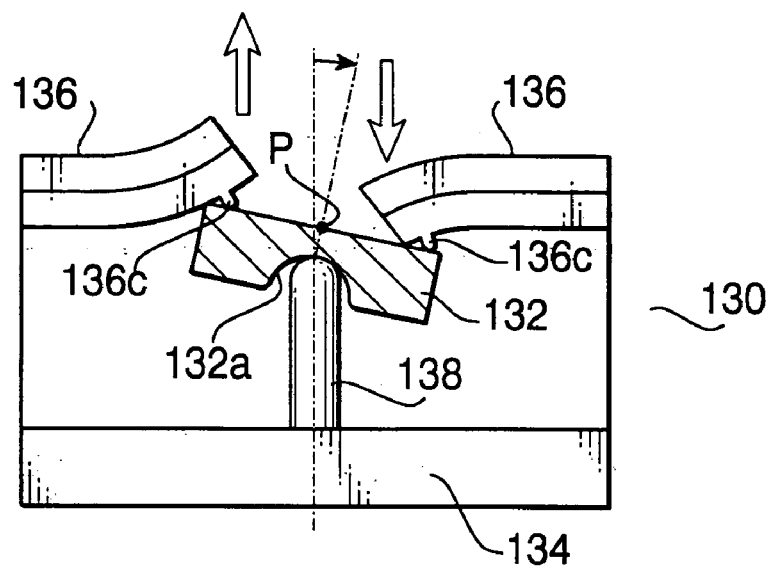
FIG. 7 is a schematic diagram showing the composition of a scanning mirror unit which is provided to the tip of an optical beam scanning probe in accordance with still another embodiment of the present invention.
Figure 8:
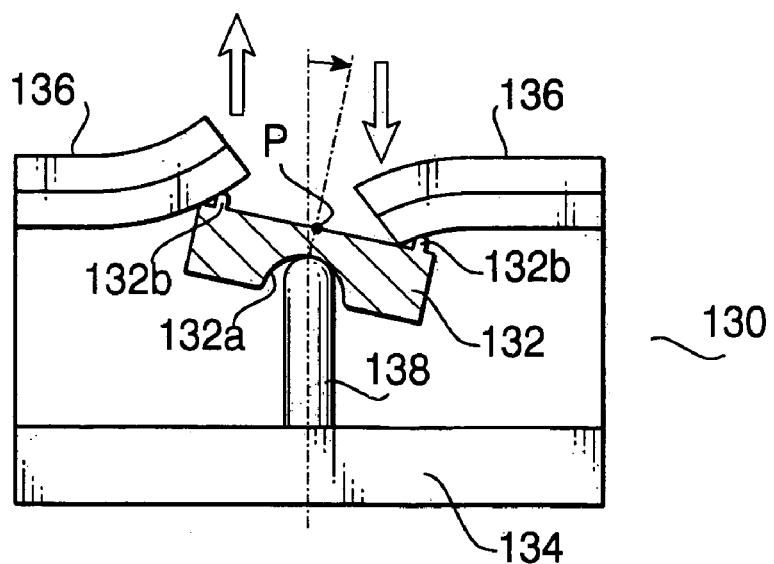
FIG. 8 is a schematic diagram showing the composition of a scanning mirror unit which is provided to the tip of an optical beam scanning probe in accordance with still another embodiment of the present invention.

While each cantilever 136 in the above embodiments supported the movable mirror 132 by the surface of the piezoelectric material 136b facing the movable mirror 132, a convexity 136c may be formed on the surface of each cantilever 136 to support the movable mirror 132 as shown in FIG. 7. The convexity 136c may either be formed in a hemispheric shape or pointed like a needle. It is also possible to form similar convexities 132b on the reflecting surface side of the movable mirror 132 to make contact with the cantilevers 136 as shown in FIG. 8. In these cases, the aforementioned wear-resistant coating may be provided to the interface between the convexity 136c and the movable mirror 132 shown in FIG. 7 or the interface between the convexity 132b and the cantilever 136 shown in FIG. 8 for improving the wear resistance of the interface.

Figure 9A:
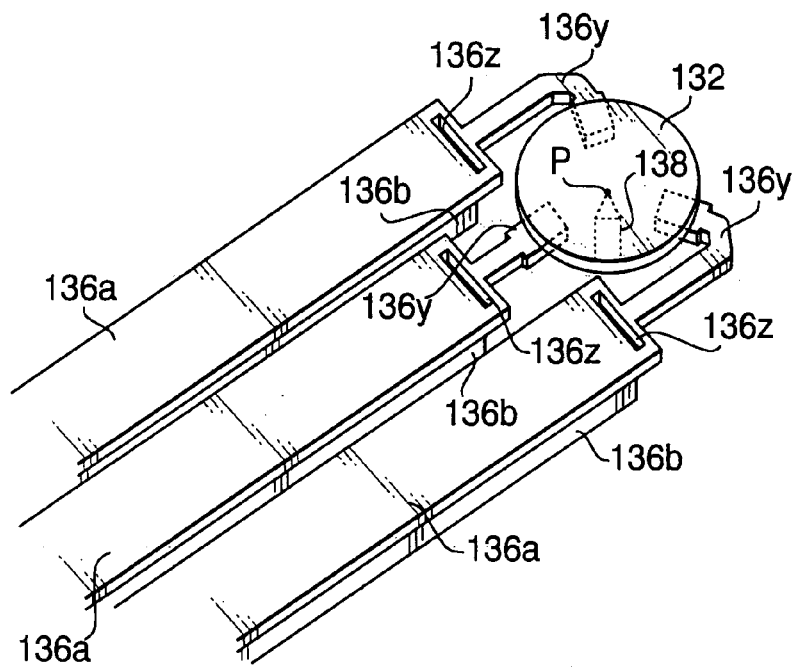
FIGS. 9A through 9C are schematic diagrams showing the composition of a scanning mirror unit around its movable mirror in accordance with still another embodiment of the present invention.
Figure 9B:
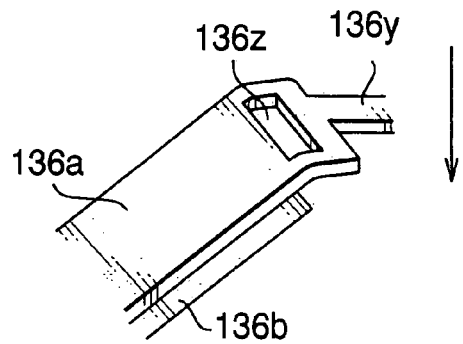
Figure 9C:
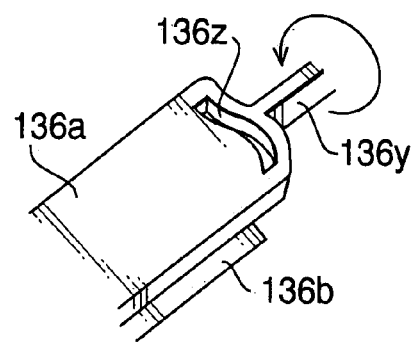

Instead of the convexity 136c shown in FIG. 7, the cantilever 136 may also be provided with a deformation part which is deformed biaxially as shown in FIGS. 9A through 9C. FIG. 9A is a perspective view showing the composition of the example around the movable mirror 132. FIGS. 9B and 9C are schematic diagrams showing statuses of the deformation part when external force is applied to the cantilever 136. In this embodiment, each of the three cantilevers 136 is provided with the deformation part which includes a torsion bar 136y and an aperture part 136z. The torsion bar 136y, which is a bar formed in the lengthwise direction of the cantilever 136, twists and bends depending on the external force. One end of the torsion bar 136y is bonded to the support surface of the movable mirror 132 by face-to-face contact and the other end is formed integrally with the elastic material 136a. The aperture part 136z has an aperture which is formed in the elastic material 136a to spread in a direction orthogonal to the lengthwise direction of the elastic material 136a. When the cantilever 136 at the center in FIG. 9A moves to the reflecting surface side of the movable mirror 132 for example, the cantilever 136 tilts the movable mirror 132 with its aperture part 136z (parts on both sides of the aperture) bent as shown in FIG. 9B. Meanwhile, the cantilevers 136 on both sides of the central cantilever 136 in FIG. 9A twist their torsion bars 136y so as to absorb the tilt of the movable mirror 132 as shown in FIG. 9C. Thus, the deformation part can be deformed at least biaxially thanks to the torsion bar 136y and the aperture part 136z. By forming parts of the aperture part 136z around the aperture to have different thicknesses depending on their directions (lengthwise direction or width direction), it is possible to let the parts on both sides of the aperture bend more flexibly and let the torsion bar 136y twist more easily. In this embodiment, the cantilevers 136 are bonded to the support surface of the movable mirror 132, therefore, substantially the whole of the reflecting surface side of the movable mirror 132 can be used as the reflecting surface, differently from the above embodiments.

While the cantilevers 136 in the above embodiments were formed by use of a piezoelectric material, the cantilever 136 can also be composed of a combination of members having different thermal expansion coefficients. In this embodiment, the piezoelectric material 136b of the above embodiments is replaced with an elastic material having a thermal expansion coefficient different from that of the elastic material 136a. In short, the cantilever 136 in this embodiment is formed by bonding two different elastic materials together. An electric heater is attached on the surface of at least one of the two elastic materials. When electric current is supplied to the electric heater, heat emitted by the electric heater deforms the two elastic materials. Due to the difference of thermal expansion coefficient, the two elastic materials exhibit different deformations and thereby the cantilever 136 of this embodiment bends and presses the movable mirror 132 in a prescribed direction similarly to the cantilever 136 of the above embodiments.

While the observation images in the above embodiments were acquired based on reflection light that is obtained by applying the optical beam (emitted by the observation light source unit 210) to the observation target, it is also possible to apply an ultrasonic beam to the observation target and acquire observation images from sound waves reflected by the observation target. Such an embodiment can be implemented by replacing the observation light source unit 210 with an ultrasonic transducer drive circuit, replacing the optical fiber with electric wiring, and replacing the lens with an ultrasonic transducer. In this embodiment, the ultrasonic beam emitted by the ultrasonic transducer toward the movable mirror 132 is scanned on the observation target by the movement of the movable mirror 132, by which 2-D images are acquired by the probe of this embodiment. Since image information in the depth direction of the observation target can also be obtained by use of the ultrasonic beam similarly to the OCT (Optical Coherence Tomography), the probe of this embodiment is also capable of acquiring 3-D images. Desirable frequencies of the ultrasonic beam for this embodiment may be, for example, approximately between 10 MHz and 30 MHz, similarly to those used for IVUS (IntraVascular UltraSound) imaging.

Figure 10:
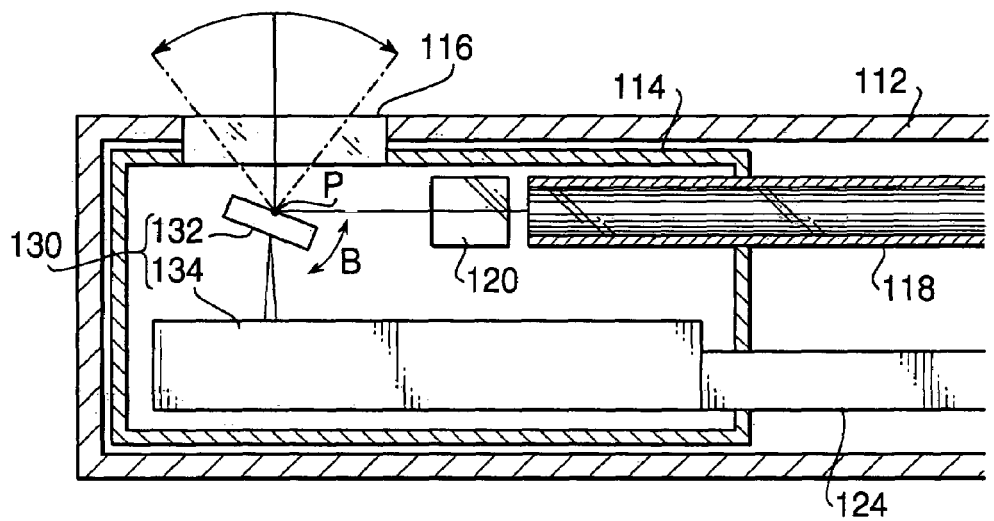
FIG. 10 is a sectional side view schematically showing the internal composition of the tip of an optical beam scanning probe in accordance with still another embodiment of the present invention.

While the scanning mirror unit 130 in the embodiment of FIG. 6 was tilted by a preset angle relative to the lengthwise direction of the optical beam scanning probe, the scanning mirror unit 130 may also be composed as shown in FIG. 10, in which parts of the scanning mirror unit 130 other than the movable mirror 132 (base, cantilevers, etc.) are placed in parallel with the lengthwise direction of the probe while only the movable mirror 132 is tilted by a prescribed angle. In this embodiment, the beam emerging from the objective optical system 120 is directly reflected by the movable mirror 132 to be applied to the observation target through the observation window 116.

Figure 11:
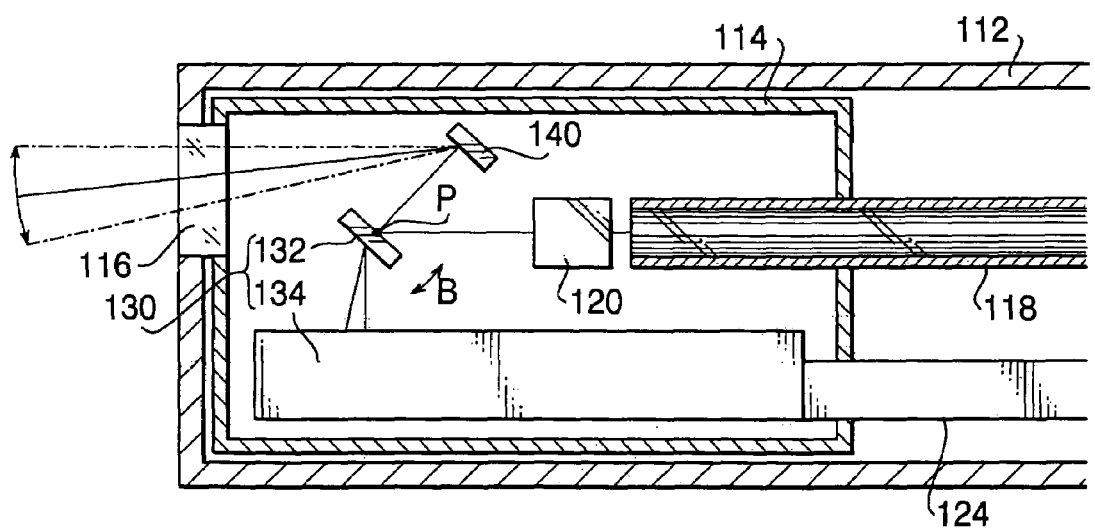
FIG. 11 is a sectional side view schematically showing the internal composition of the tip of an optical beam scanning probe in accordance with still another embodiment of the present invention.

While the optical beam scanning probes of the above embodiments were lateral view probes, the present invention is also applicable to direct view probes like the one shown in FIG. 11. In this embodiment, the scanning mirror unit 130 has the same composition as that of FIG. 10. The observation window 116 is provided to the front end face of the optical beam scanning probe 100. In the package 114, a fixed mirror 140 is further installed for guiding the beam reflected by the movable mirror 132 to the observation window 116. The beam emerging from the objective optical system 120 is directly reflected by the movable mirror 132, further reflected by the fixed mirror 140, emerges from the observation window 116, and irradiates the observation target facing the front end face of the optical beam scanning probe 100.

As still another embodiment, the scanning mirror unit 130 of the above embodiments may be provided with sensors for measuring the movements or displacements of the cantilevers 136. In this embodiment, the movement/displacement of each cantilever 136 is measured by each sensor and the current or voltage supplied to each cantilever 136 is adjusted (that is, the displacement of the front end of each cantilever 136 is adjusted) by an unshown feedback circuit, etc. based on the measurements by the sensors, by which scanning accuracy of the measurement beam (or a reference beam) applied to the observation target in the body cavity can be increased.

As described above, the scanning mirror unit in accordance with the embodiments of the present invention comprises: at least one cantilever made of material deforming itself when activated, which is supported by a base at its one end to have a free end; and a movable mirror which is supported at least by the free end of the at least one cantilever at its peripheral part so that it can be moved while leaving its central part substantially fixed at the same position. When the cantilever is activated, the free end of the cantilever moves in a prescribed direction to move the peripheral part of the movable mirror with the central part substantially fixed at the same position to cause a tilt to the movable mirror. With such composition of the scanning mirror unit, a reflecting member having a sufficient thickness (e.g. some hundreds of microns) can be employed for the movable mirror. Such a scanning mirror unit is capable of reflecting a high power laser beam effective for treatment of affected parts, etc. finely and durably. In the case where the movable mirror is revolved and tilted by use of piezoelectric materials which are cheap, the scanning mirror unit can be manufactured at a low cost. Further, since the cantilevers can be formed in long shapes, the stroke of the free end of each cantilever in the prescribed direction can be set long enough. Therefore, a sufficient tilt angle of the movable mirror can be secured while achieving miniaturization of the scanning mirror unit. With the scanning mirror unit of the embodiments, it is also possible to fix the movable mirror at a specific angle easily by controlling the position or displacement of the free end of each cantilever. In the case where the angle of the movable mirror is fixed, the irradiating conditions (pulse width, irradiation time, intensity, etc.) can be changed and adjusted with the irradiation position of the treatment laser beam fixed on the target, by which efficient and accurate treatment of the target is made possible.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The present disclosure relates to the subject matter contained in Japanese Patent Application No. 2003-163449, filed on Jun. 9, 2003, which is expressly incorporated herein by reference in its entirety.

What is claimed is:

1. A scanning mirror unit for scanning a beam, comprising:
    at least one cantilever made of material that deforms when activated, the at least one cantilever having a movable end and being supported by a base at another end; and
    a movable mirror which is supported at least by the movable end of the at least one cantilever at a peripheral part of the movable mirror so that the movable mirror is movable while a central part of the movable mirror is substantially fixed at the same position,
    wherein when the cantilever is activated the movable end of, the cantilever moves in a prescribed direction to move the peripheral part of the movable mirror with the central part substantially fixed at the same position to cause a tilt to the movable mirror.

2. The scanning mirror unit according to claim 1,
    wherein the cantilever is formed by bonding an elastic material and a piezoelectric material together, and
    wherein the movable end of the cantilever moves in the prescribed direction when voltage is applied to the piezoelectric material.

3. The scanning mirror unit according to claim 1,
    wherein the cantilever is formed by bonding an elastic material and two piezoelectric materials sandwiching the elastic material together, and
    wherein the movable end of the cantilever moves in the prescribed direction when voltage is applied to the two piezoelectric materials.

4. The scanning mirror unit according to claim 1,
    wherein the cantilever is formed by bonding two piezoelectric materials together, and
    wherein the movable end of the cantilever moves in the prescribed direction when voltage is applied to the two piezoelectric materials.

5. The scanning mirror unit according to claim 1,
    wherein the cantilever is formed by bonding two materials having different thermal expansion coefficients together and providing at least one of the materials with an electric heater, and
    wherein the movable end of the cantilever moves in the prescribed direction when electric current is supplied to the electric heater.

6. The scanning mirror unit according to claim 1,
    wherein the beam is one selected from an optical beam as a bundle of rays and an ultrasonic beam as a bundle of ultrasonic waves.

7. The scanning mirror unit according to claim 1, further comprising:
    an axis head which supports the central part of a support surface of the movable mirror which is opposite to a reflecting surface of the movable mirror,
    wherein the cantilever supports the peripheral part of the reflecting surface of the movable mirror.

8. The scanning mirror unit according to claim 1,
    wherein a deformation part which is deformable at least biaxially is formed between the cantilever and the movable mirror.

9. The scanning mirror unit according to claim 8,
    wherein the deformation part is formed integrally with the cantilever.

10. The scanning mirror unit according to claim 1,
    wherein the movable end of the cantilever is provided with a convexity which supports the peripheral part of the movable mirror.

11. The scanning mirror unit according to claim 1,
    wherein the peripheral part of the movable mirror is provided with a convexity which is supported by the movable end of the cantilever.

12. The scanning mirror unit according to claim 7,
    wherein the central pad of the support surface of the movable mirror is provided with a concavity which is supported by the axis head.

13. The scanning mirror unit according to claim 1,
    wherein the at least one cantilever includes a plurality of cantilevers.

14. The scanning mirror unit according to claim 13,
    wherein the cantilevers are arranged so that their lengthwise directions will coincide with one another.

15. A beam scanning probe for obtaining observation images by scanning a beam emitted by a wave source unit on an observation target in a body cavity using a scanning mirror unit, the scanning mirror unit comprising:
    at least one cantilever made of material that deforms when activated, the at least one cantilever having a movable end and being supported by a base at another end; and
    a movable mirror which is supported at least by the movable end of the at least one cantilever at a peripheral part of the movable mirror so that the movable mirror is movable while a central part of the movable mirror is substantially fixed at the same position,
    wherein when the cantilever is activated, the movable end of the cantilever moves in a prescribed direction to move the peripheral part of the movable mirror with the central part substantially fixed at the same position to cause a tilt to the movable mirror.

16. The beam scanning probe according to claim 15,
    wherein the beam is one selected from an optical beam as a bundle of rays and an ultrasonic beam as a bundle of ultrasonic waves.

17. The beam scanning probe according to claim 15,
    wherein the scanning mirror unit is installed in the tip of the beam scanning probe, and
    wherein the at least one cantilever is placed so that a lengthwise direction of the at least one cantilever will coincide with that of the beam scanning probe.

18. The beam scanning probe according to claim 17,
    wherein the at least one cantilever includes a plurality of cantilevers.

19. The beam scanning probe according to claim 15, further comprising:
    a transmitting member which is provided to a lateral face of the beam scanning probe for transmitting the beam, wherein the movable mirror is tilted relative to the lengthwise direction so that the beam is guided to the transmitting member by the movable mirror.

20. The beam scanning probe according to claim 15, further comprising:

a transmitting member which is provided to a front end face of the beam scanning probe for transmitting the beam; and a fixed mirror which is fixed so as to guide the beam reflected by the movable mirror to the transmitting member, wherein the movable mirror is configured to guide the beam to the fixed mirror.

* * * * *